United States Patent [19]

Pelka et al.

[11] Patent Number: 5,558,892
[45] Date of Patent: Sep. 24, 1996

[54] METHOD AND APPARATUS FOR MAKING CHURROS

[76] Inventors: Angeles Pelka; Bertha Betancourt; Rogelio Catano, all of 7741 Dianjou Dr., El Paso, Tex. 79912

[21] Appl. No.: 328,811

[22] Filed: Oct. 25, 1994

[51] Int. Cl.$^6$ ...................................... A21C 11/18
[52] U.S. Cl. ...................... 426/283; 426/282; 426/284; 426/496; 426/443; 426/445; 426/448; 426/516; 426/517; 425/87; 425/376.1; 425/380; 74/89.17; 116/172; 222/39; 222/386
[58] Field of Search ...................... 426/282, 283, 426/284, 496, 516, 517, 443, 445, 448; 425/380, 376.1, 87; 74/89.17; 116/172; 222/39, 386

[56] References Cited

U.S. PATENT DOCUMENTS

| | | | |
|---|---|---|---|
| 140,695 | 7/1873 | Fuller | 425/376.1 |
| 603,122 | 4/1898 | Bhise | 222/39 X |
| 1,083,129 | 12/1913 | Paolucci | 222/39 X |
| 1,253,917 | 1/1918 | Wern | 425/376.1 X |
| 1,265,853 | 5/1918 | Wiseman | 426/282 X |
| 1,299,819 | 4/1919 | Bouchet | 426/557 |
| 1,444,041 | 2/1923 | Schulz et al. | 425/380 X |
| 1,546,155 | 7/1925 | Wadsworth | 425/380 X |
| 1,556,617 | 10/1925 | Laskey | 425/380 X |
| 1,648,359 | 11/1927 | Newman | 476/284 X |
| 1,657,992 | 1/1928 | Chambers | 222/39 X |
| 1,713,585 | 5/1929 | Wolf | 425/380 X |
| 1,761,885 | 6/1930 | Groetken | 222/39 X |
| 1,959,006 | 5/1934 | Penza | 107/14 |
| 1,996,628 | 4/1935 | Schneider | 425/376.1 |
| 1,999,926 | 4/1935 | Garzia | 425/380 |
| 2,055,868 | 9/1936 | Larsen | 425/376.1 |
| 2,101,075 | 12/1937 | Krag | 426/516 X |
| 2,308,937 | 1/1943 | Schwab | 425/380 |
| 2,420,616 | 5/1947 | Palmer | 425/376.1 X |
| 2,777,607 | 1/1957 | Bellondi | 222/39 |
| 2,879,163 | 3/1959 | Anson et al. | 426/517 X |
| 3,402,682 | 9/1968 | Peden et al. | 425/380 X |
| 3,479,970 | 11/1969 | Carbajal | 425/380 X |
| 3,480,445 | 11/1969 | Slaybaugh | 99/83 |
| 3,615,675 | 10/1971 | Fowler et al. | 99/83 |
| 3,649,303 | 3/1972 | Hayhurst et al. | 99/182 |
| 3,894,159 | 7/1975 | Franta | 426/284 |
| 4,039,691 | 8/1977 | Hildebolt | 426/511 |
| 4,083,666 | 4/1978 | Richardson | 425/376.1 X |
| 4,162,333 | 9/1979 | Nelson et al. | 426/283 |
| 4,360,332 | 11/1982 | Cyin | 425/376.1 X |
| 4,752,488 | 6/1988 | Hayashi | 426/281 |
| 4,859,165 | 8/1989 | Hoashi | 425/133 |
| 4,960,601 | 10/1990 | Cummins | 426/504 |
| 4,963,377 | 10/1990 | Rimmeir | 426/283 |
| 5,000,084 | 3/1991 | Walliker | 99/354 |
| 5,077,074 | 12/1991 | Van Lengerich | 426/516 X |
| 5,139,806 | 8/1992 | Hauser | 426/496 |
| 5,198,239 | 3/1993 | Beavers | 426/516 X |
| 5,246,721 | 9/1993 | Kerkonian | 426/279 |

*Primary Examiner*—Esther M. Kepplinger
*Assistant Examiner*—Milton I. Cano
*Attorney, Agent, or Firm*—R. Wayne Pritchard

[57] ABSTRACT

A method and machine for making churros. The machine extrudes churros through a die. The die has a central mandrel so that hollow churros are made which can be filled. The churros are extruded from the machine when an operator rams a crank on the machine. Consistent, high quality churros can be made at high production rates suitable for use in a restaurant.

12 Claims, 5 Drawing Sheets

METHOD AND APPARATUS FOR MAKING CHURROS

FIELD OF INVENTION

This invention relates to a method of making a filled pastry food product. More specifically it relates to a method of extruding a hollow cylindrical dough shell which can be filled with another food product. The food product made is a Mexican dessert food called a churro.

BACKGROUND OF THE INVENTION

Churros are a popular Mexican dessert food. A churro is a cylindrical pastry which is deep fried and typically covered with sugar and cinnamon. The dough from which churros are made is similar to, but somewhat heavier than, donut dough. Churros usually have a cross sectional shape which is fluted or star-shaped.

Churros have long been popular in Mexico and in southwestern parts of the United States. Mexican food is rapidly gaining popularity in other parts of the U.S. and it is expected that churros will also gain popularity throughout the country. As the demand for churros grows it would be desirable to have a method for making them which can be easily learned and used by anyone. It would also be desirable to have a method for making churros which will result in a high quality product even when used by someone with no prior experience making them.

Churros are usually made by placing the dough in a bag with a nozzle on one end. The bag is then squeezed to force the dough through the nozzle to extrude the churro dough. The nozzle can have a fluted shape so as to produce a churro with a fluted cross section. The size of the nozzle determines the cross sectional diameter of the churro.

There are many problems with current techniques for making churros. First of all, there is a problem with producing a churro of consistent size and weight. Churros made with current techniques often do not come out straight. If the pressure from squeezing the bag is not even then the dough will curve as it comes out of the nozzle and the churro will be circular or spiral in shape. This results in the waste of dough and time. Another problem with current methods for making churros is obtaining a consistent length.

A major problem of current methods for making churros is that they are not suitable for high volume production as might be desirable in a restaurant. It is very slow to squeeze churros through a bag as is presently done. Furthermore, many churros do not come out satisfactorily and must be discarded. This wastes time and contributes to the inefficiency of current methods. One solution that has been used for the problem of high volume production is to preform and freeze the churros and reheat them just before sale. This is not acceptable because it results in diminished quality and freshness.

SUMMARY OF INVENTION

The present invention is directed to a method of extruding churros through a churro machine which results in consistent high quality products which can be made in high volume production. The machine used in the method has a cylinder which holds dough. A piston in the cylinder forces the dough out through a die in one end of the cylinder. The piston is moved through the cylinder by turning a crank on the machine. The machine can be designed so that one turn of the crank delivers one churro. In this way, high quality churros of great consistency can be made at a high volume production compared to current methods.

The churro machine of the present invention has an extrusion die with a central mandrel in it so that the churros will have a hollow center which can be filled with honey, pudding, jelly or some other filling. The machine is also interesting to watch while it makes churros. Therefore restaurants which use the churro machine of the present invention will attract additional customers who come to the restaurant to watch the machine make churros.

One object of the invention is to provide a method for forming churros or other food products.

Another object of the invention is to provide a method for producing churros of consistent high quality.

Another object of the invention is to provide a method for producing churros at a high production rate which is suitable for sue in a restaurant.

Another object of the invention is to provide a method and apparatus for making a churro which is hollow and which can be filled.

Another object of the invention is to provide a method and apparatus for making churros which is interesting and entertaining to watch.

Another object of the invention is to provide a machine for making churros which is easy to disassemble and to clean.

Another object of the invention is to provide a machine for making churros which can be manufactured at low cost so that the machine can be sold for home use.

DETAILED DESCRIPTION OF THE INVENTION

Figure 1:
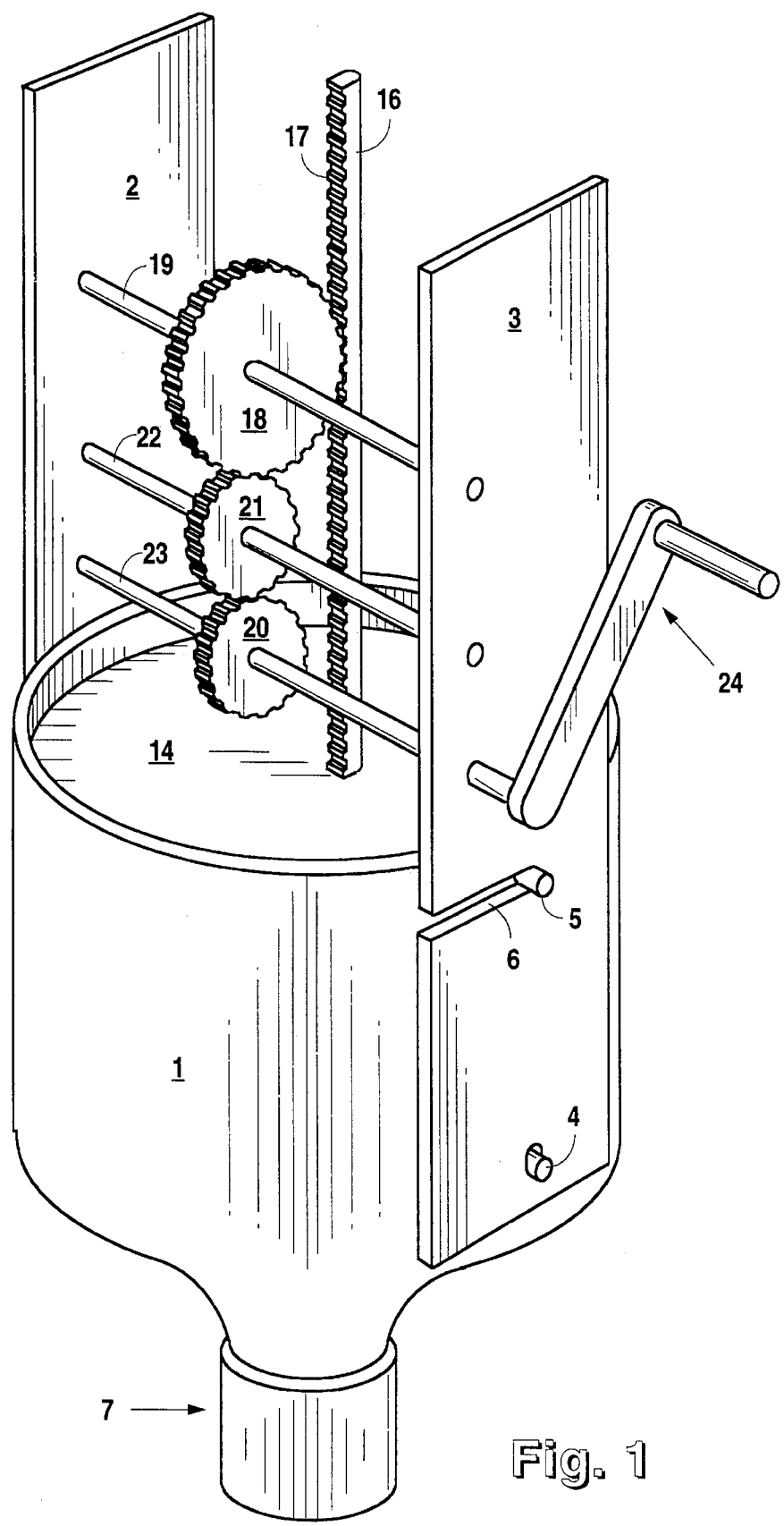
FIG. 1 is an isometric view of a first preferred embodiment of the churro machine of the present invention.

As seen in FIG. 1, the first preferred embodiment of the churro machine has a cylinder 1 which holds dough. The cylinder 1 is held in place by left and right frame members 2, 3. The cylinder 1 is attached to the frame members 2, 3 by pivot pins 4 on the frame members 2, 3 and stabilizing pins 5 on the cylinder. The cylinder is attached to the frame members 2, 3 by putting the pivot pins 4 into corresponding notches in the cylinder 1 with the top of the cylinder 1 facing outwards away from the frame members. The cylinder 1 is then rotated so that stabilizing pins 5 move into and mate with slots 6 on the frame members 2, 3.

Figure 2:
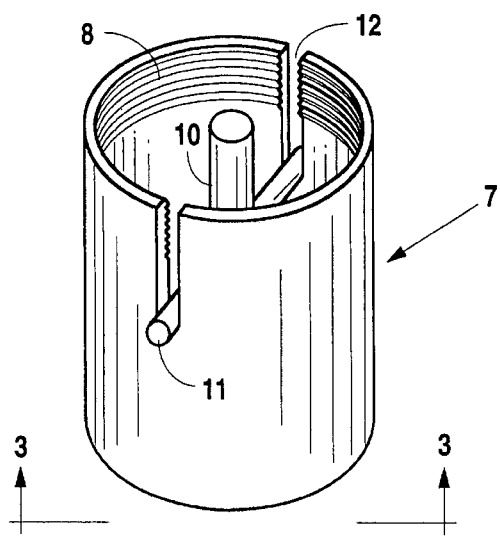
FIG. 2 is an isometric view of the die assembly used on the first preferred embodiment of the churro machine of the present invention.
Figure 3:
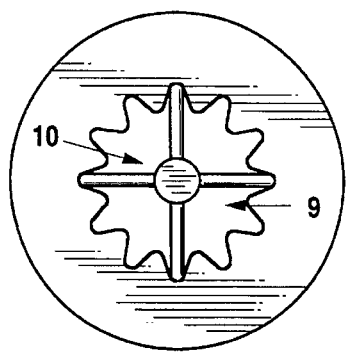
FIG. 3 is a bottom view of the die assembly used on the first preferred embodiment of the churro machine of the present invention.
Figures 4, 5:
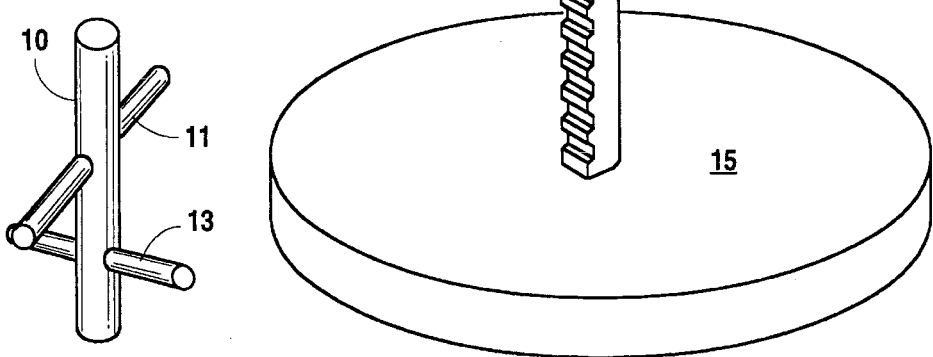
FIG. 4 is the central mandrel which forms part of the die assembly.
FIG. 5 is the piston used in the first preferred embodiment of the churro machine.

The cylinder has a die assembly 7 on its lower side. The die assembly can be seen better in FIGS. 2–4. As seen in FIG. 2, the die assembly has threads 8 which screw onto matching threads on the bottom of the cylinder 1. The die assembly can be unscrewed from the cylinder for cleaning and screwed back on during operation. The die assembly has an extrusion hole 9 through which the dough passes during extrusion. The extrusion hole 9 can be seen in FIG. 3 to be fluted or star shaped. The extrusion hole 9 can be of any shape depending on the food product being made. For making churros, however, it is preferably of the shape shown. In the center of the extrusion hole is a central mandrel 10. The mandrel 10 forms a hole in the center of the churro. The mandrel 10 can be seen by itself in FIG. 4. The mandrel 10 is held into place on the die assembly 7 with arms 11 which fit into slots 12 on the die assembly. The mandrel 10 is stabilized by arms 13 which rest against the inside wall of the die assembly 7. The mandrel 10 can be removed from the die assembly 7 for cleaning by sliding the arms 11 out of slots 12.

Dough is forced from cylinder 1 through die assembly 7 by moving a piston 14 through the cylinder 1. The piston 14 can be seen best in FIG. 5. The piston has a plate member 15 which is sized to fit snugly inside the cylinder 1. The plate member is pressed down on top of the dough in cylinder 1 to force it through the die assembly 7. In order to move the piston plate member 15 there is a push bar 16 attached to it. The push bar 16 may be welded to the plate member 15 or it may be otherwise attached in a manner that allows removal for thorough cleaning. The push bar 16 has gear teeth 17 attached thereto. The gear teeth 17 on push bar 16 form the rack part of a rack and pinion mechanism. The rack and pinion mechanism can be best seen in FIG. 1.

The gear teeth 17 on push bar 16 mate with the teeth on drive gear 18. The drive gear 18 is attached to frame members 2, 3 with a shaft 19. The shaft 19 may be attached to frame members 2, 3 with bearings, bushings or other means which allows rotation. The drive gear 18 is driven by a crank gem 20 which transmits power through idler gear 21. Crank gear 20 and idler gear 21 are attached to frame members 2, 3 with shafts 22 and 23. Shaft 22 has a crank handle 24 attached thereto which an operator can turn to move the piston 14.

The crank gear 20, idler gear 21, and drive gear 18 are sized with a predetermined gear ratio so that, for a given diameter cylinder 1 and piston 14, one full rotation of crank handle 24 will produce one churro. The gear ratios and cylinder diameter may of course be chosen so that some other angular rotation of crank handle 24 will produce one churro. For instance, the ratios may be chosen so that two rotations of crank handle 24 will produce one churro. The handle can be designed to have a bell or other audible signal that will inform the operator that one churro has been finished. The use of a consistent rotation angle for the handle, such as one rotation, has the advantage that consistent length churros can be made at high production volume.

The idler gear 21 serves two purposes. First of all it reverses the direction of rotation of drive gear 18 so that a clockwise rotation of crank handle 24 causes the piston 14 to move downwards rather than upwards. The idler gear does serve another purpose. It adds an additional moving part. When the churro machine is placed within view of customers in a restaurant it will attract their attention and entertain them to see the gears turn and a churro come out the bottom. The more moving parts and gears that are present, the more interesting the machine is for customers to watch. Indeed it may be desirable to put in additional idler gears of various sizes, colors, or orientations just to make the machine more interesting to watch. Naturally, additional moving parts make the machine more complicated, trouble prone, and costly.

Figure 6:
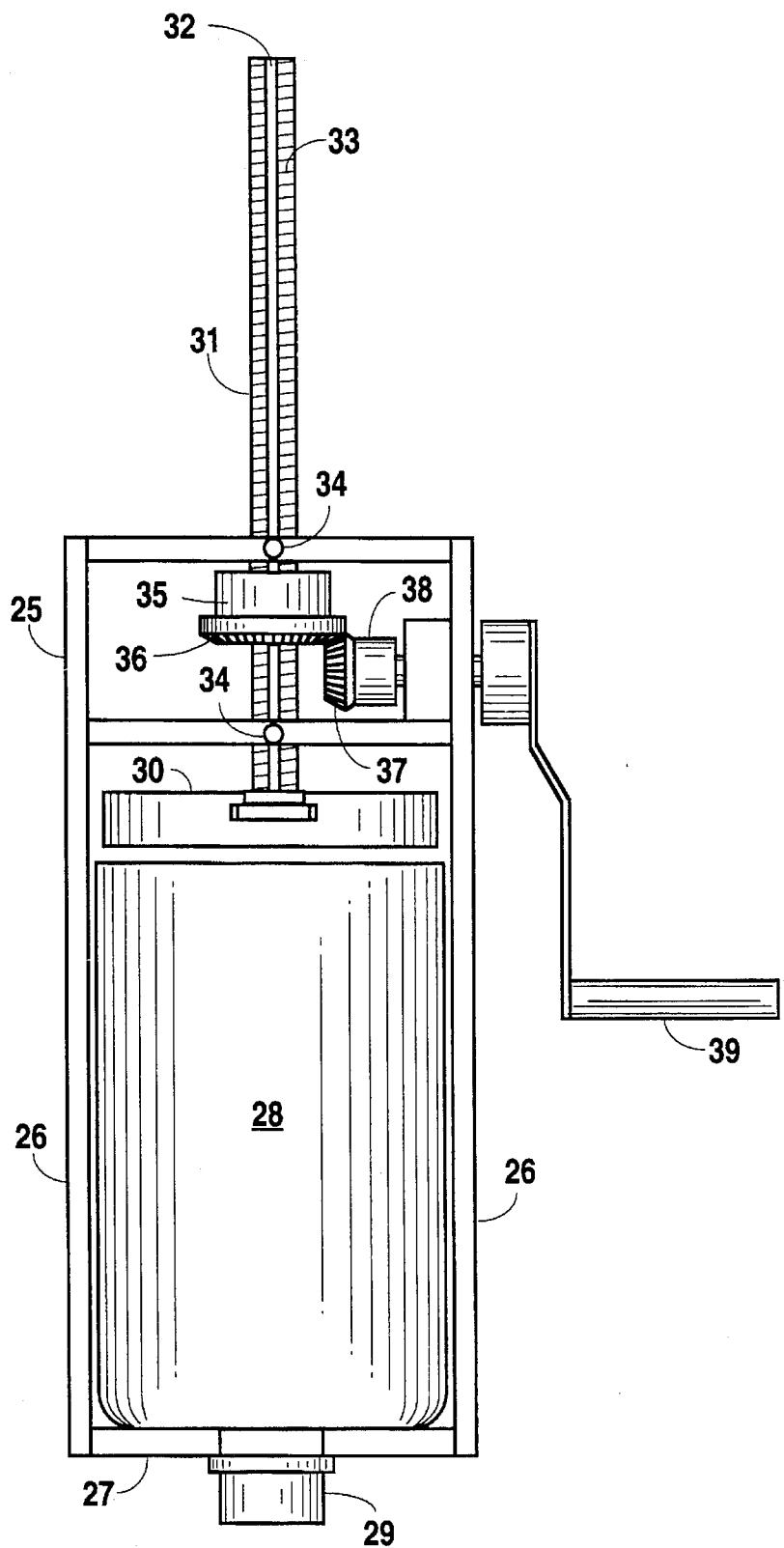
FIG. 6 is a second preferred embodiment of the churro machine of the present invention.
Figure 7:
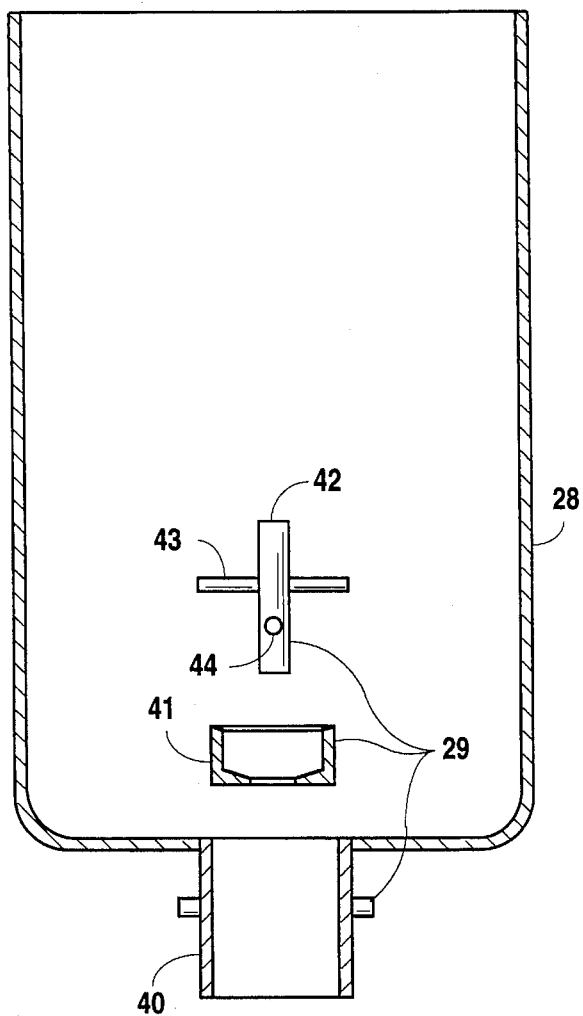
FIG. 7 is an exploded view of the die assembly of the second preferred embodiment of the churro machine.
Figure 8:
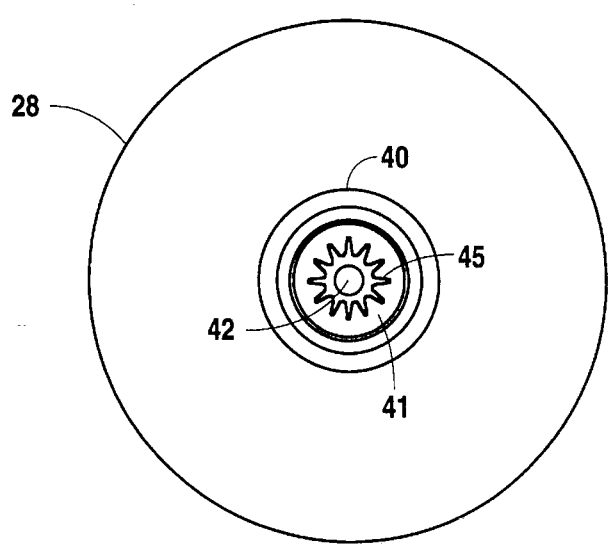
FIG. 8 is a bottom view of the second preferred embodiment of the churro machine.

A second preferred embodiment of the invention is shown in FIGS. 6–8. This embodiment of the invention uses fewer parts and so it is simpler and cheaper to make. However, because it has fewer moving parts it may not be as interesting to watch as the machine of the first preferred embodiment.

The churro machine of the second preferred embodiment has a frame 25 with side frame members 26 and a bottom frame member 27. A cylinder 28 rests on the bottom frame member 27. The bottom frame member 27 has a slot cut into it. A die assembly 29 on the cylinder 28 fits into the slot in the bottom frame member 27. The weight of the cylinder 28 is supported by the bottom frame member 27.

Dough is forced from the cylinder 28 through the die assembly 29 by a piston 30. The piston 30 has a push bar 31 on it. The push bar 31 is generally cylindrical and of circular cross-section. The push bar 31 has a slot 32 machined into it which runs longitudinally down its length. The push bar 31 also has spiral gear teeth 33 machined into it so that the push bar forms a worm gear. There are detents 34 on the frame 25 which mate with the slot 32 on push bar 31. The detents 34, together with slot 32, form a track to guide the piston 30 through the cylinder 28.

A drive gear 35 has internal spiral gear teeth which mate with gear teeth 33 on the push bar. Thereby, when the drive gear 35 is turned the cylinder 30 moves through the cylinder 28. Drive gear 35 has bevel gear teeth 36 on it which mate with bevel gear teeth 37 on crank gear 38. Crank gear 38 is drivingly attached to a crank handle 39.

When the crank handle 39 is turned, the crank gear 38 turns drive gear 35 which, in turn, drives push bar 31 and piston 30. The gear ratio between crank gear 38 and drive gear 35 and the pitch of gear teeth 33 may be selected so that one turn of crank 39 moves the piston 30 by a predetermined distance through cylinder 28 so as to form a single churro. The die assembly 29 is shown in an exploded view in FIG. 7. The die assembly 29 is composed of a housing 40 which is integral with cylinder 28. The die endpiece 41 is removable from the housing 40. There may be several die endpieces 41, each with a different shape opening. The outer diameter of the die endpiece 41 is the same as the inner diameter of housing 40 so that the endpiece fits snugly into the housing 40. A central mandrel 42 is also removable from the housing 40 so that the die assembly can be cleaned. The central mandrel 42 has arms 43 which fit into slots in housing 40. Central mandrel 42 also has arms 44 whose length is equal to the inner diameter of housing 40 so that the central mandrel 42 is stabilized within the housing 40. FIG. 8 shows an end view of the cylinder 28 showing the die assembly 40. The die endpiece 41 can be seen with an opening 45 through which the dough passes. The central mandrel 42 can be seen in the center of the die so as to form a hollow center in the extruded churro.

All components of the churro machine should preferably be made from stainless steel for durability and ease of cleaning. However, it is possible to make the machine out of plastic to reduce the cost of the machine. Stainless steel is the preferred material when the machine is used commercially in a restaurant but home use versions of the churro machine may be made from plastic.

It should be noted that it is desirable to install the machine in a vertical orientation so that the churros hang vertically when they are extruded through the die. This will allow the churros to come out straight and prevent them from curving under the influence of gravity. If it is desired to install the machine horizontally then it will be necessary to use some sort of a support surface to hold the churros as they come out of the die so that they will not curve.

The dough to be used in this churro machine must be of the proper consistency and temperature in order to produce consistent quality churros. Naturally the dough must contain the proper ingredients to make a good churro. The ingredients for churros can be found in many cookbooks and so a discussion of the ingredients will not be presented here. It has been found that the dough must have a moisture content between 2 percent and 3 percent moisture. If there is not enough moisture content in the dough then the churros will be hard and unpleasant to eat. Also, they might break or develop holes in them as they are extruded through the die assembly 7. If there is too much moisture content then the dough will be runny and long stringy churros will result. Also, if the dough has too much moisture content, the dough might not stick together and might break off as it is extruded through the die assembly 7. Also it has been found that the temperature of the dough must be within the range of between 117° F. to 135.5° F. If the dough is colder than this it will be too hard to extrude through the die assembly 7. If the dough is too hot then its consistency will be too soft to properly extrude into churros.

The method to be used to make churros with the churro machine is quite simple. First the crank handle 24 is turned counter-clockwise until the piston 14 is raised above the top of cylinder 1. Then the cylinder 1 is rotated about pivot pins 4 until stabilizing pins 5 come out of slots 6. Dough is then placed into the cylinder 1. The cylinder 1 is then rotated back into place with stabilizing pins in slots 6. The crank handle 24 is then rotated clockwise until the piston plate member 15 pushes down onto the dough. When the piston 14 has compressed the dough enough to begin extruding dough through the die assembly 7 then churros can begin to be made. At this point the crank handle 24 is turned clockwise by one full revolution (or some other predetermined angle if the machine is so designed). After the predetermined rotation of crank handle 24 the operator may hear a bell or some other audible signal to inform them that one churro has been formed. The operator now cuts the churro to remove it from the die assembly 7 and places it in hot oil to cook; preferably the oil should be 345° F. to 355° F., and leaves it there for a predetermined length of time, preferably 3 minutes. After the churro has been cooked it is removed from the oil and can be flavored according to taste. Typically the churro is covered with sugar and cinnamon. The method should be repeated until all of the dough has been used and the piston 13 hits the bottom of the cylinder 1. At that time the operator must start over by raising the piston and refilling the cylinder 1 with dough.

Figure 9:
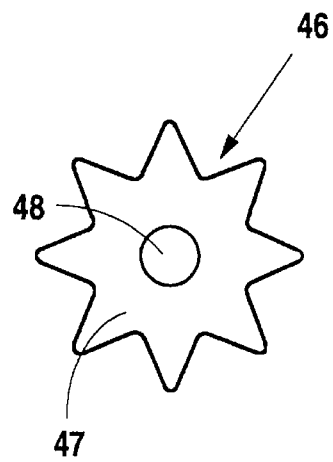
FIG. 9 is a cross sectional view of the churro made with the present invention.
Figure 10:
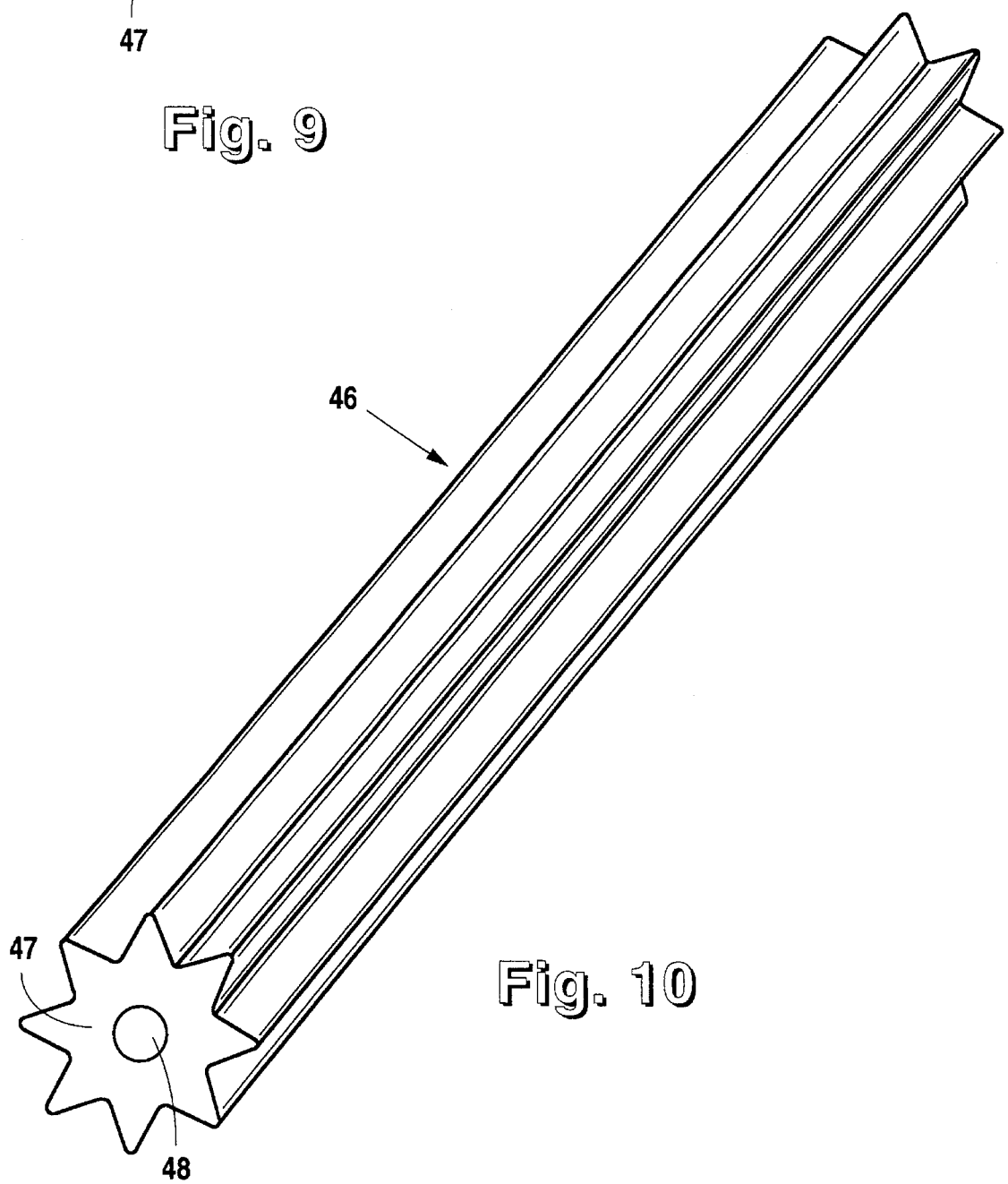
FIG. 10 is an isometric view of the churro made with the present invention.

The churros which result from this churro machine have the novel feature of being hollow in the center. The resulting churro can be seen in FIGS. 9 and 10. FIG. 9 is a cross sectional view of the churro 46. It can be seen that the churro has a solid portion of dough 47 and a hollow center 48. The hollow center 48 can be filled with any desired filling such as honey, pudding or jelly.

The method and machine of the invention allow consistent, high quality churros to be made at high production rates suitable for use in a restaurant. The churros made have a hollow center which can be filled. The machine used in the invention is easy to disassemble for cleaning and it is interesting to watch.

In the foregoing description, it will be readily appreciated by those skilled in the art that modifications may be made to the invention without departing from the concepts disclosed herein. For instance, the machine and method could be used to make food products other than churros. Also the hand crank could be modified by replacing it with a motor or other powered actuation for the cylinder,. Such modifications are to be considered as included in the following claims unless those claims, by their language, expressly state otherwise.

What is claimed is:

1. A method of making a food product comprising the steps of:

a. providing a cylindrical housing for holding a food substance, said housing having pivot pins disposed near a bottom end of said housing and extending generally horizontally from the outer surface of said housing, and stabilizing pins disposed near a top end of said housing and extending generally horizontally from said outer surface of said housing;

b. placing said food substance in said housing;

c. inserting a removably slidable piston within said housing for urging said food substance from said housing, said piston having a drive shaft extending upwardly from a top surface of said piston;

d. attaching a removable frame to said housing, said frame further comprising a drive assembly supported by a first and a second side wall, each of said side walls having a pivot pin opening for receiving one of said pivot pins, each of said side walls having an alignment slot for receiving one of said stabilizing pins;

e. operatively engaging said drive assembly with said drive shaft on said piston by moving said housing such that said stabilizing pins are received into said alignment slots;

f. attaching a removable extrusion die assembly to a discharge end of said housing for forming an extruded food product when said food substance is discharged from said die assembly by operation of said drive assembly; and g. moving said slidable piston through said housing to extrude said food substance through and out said die assembly.

2. The method of claim 1 further comprising the step of placing said extruded food product in hot oil to fry said food product.

3. The method of claim 1 wherein said step of attaching a removable die assembly to a discharge end of said housing further comprises the step of providing a central mandrel in an outlet opening of said die assembly which has a diameter that is smaller than the diameter of said outlet opening and said step of moving said slidable piston through said housing to extrude said food substance through and out said die assembly further comprises the step of diverting said food substance around said central mandrel so that said extruded food product is of an annular shape with a hollow inner portion and a solid outer portion.

4. The method of claim 3 wherein said outlet opening has a fluted outer periphery and said central mandrel is substantially circular in shape whereby, when said extruded food product is formed it is of an annular shape with a fluted outer periphery and a substantially circular inner hollow portion.

5. The method of claim 3 further comprising the step of filling said inner hollow portion of said extruded food product with a different food substance.

6. The method of claim 1 wherein said step of placing a food substance in said housing further comprises the step of providing a food substance which has between 2 percent and 3 percent moisture content.

7. The method of claim 1 wherein the step of placing said food substance in said housing further comprises the step of providing said food substance at a temperature between 117° F. and 135.5° F.

8. The method of claim 6 wherein the step of placing said food substance in said housing further comprises the step of providing said food substance at a temperature between 117° F. and 135.5° F.

9. The method of claim 1 wherein a hand crank is drivably connected to said piston for moving said slidable piston through said housing and wherein said step of moving said slidable piston through said housing further comprises the step of manually rotating said hand crank to move said slidable piston through said housing.

10. The method of claim 9 wherein said step of manually rotating said hand crank to move said slidable piston through said housing further comprises moving said hand crank through a predetermined angular displacement to extrude a predetermined amount of said food substance through and out said die assembly.

11. The method of claim 10 wherein said predetermined angular displacement is one complete revolution and said predetermined amount of said food substance yields one unit of food product.

12. An apparatus for producing an extruded food product comprising:

a cylindrical housing for holding said food product, said housing having pivot pins disposed near a bottom end of said housing and extending generally horizontally from the outer surface of said housing, and stabilizing pins disposed near a top end of said housing and extending generally horizontally from said outer surface of said housing;

a piston removably slidable within said housing for urging said food product from said housing, said piston having a drive shaft extending upwardly from a top surface of said piston;

a frame removably attachable to said housing, said frame further comprising a drive assembly supported by a first and a second side wall, each of said side walls having a pivot pin opening for receiving one of said pivot pins, each of said side walls having an alignment slot for receiving one of said stabilizing pins, said drive assembly operatively engageable with said drive shaft on said piston when said stabilizing pins are cooperatively received into said alignment slots by rotation of said side walls about said pivot pins in said pivot pin openings; and an extrusion die assembly removably affixed to a discharge end of said housing for forming said extruded food product when said product is discharged from said die assembly by operation of said drive assembly.

* * * * *